(12) United States Patent
Schelkens et al.

(10) Patent No.: US 6,904,091 B1
(45) Date of Patent: Jun. 7, 2005

(54) METHODS AND APPARATUS FOR PROGRESSIVE TRANSMISSION OF SUBBAND IMAGES

(75) Inventors: Peter Schelkens, Willebroek (BE); Jan Cornelis, Overijse (BE)

(73) Assignees: IMEC VZW, Leuven (BE); Vrije Universiteit Brussel, Brussels (BE)

( * ) Notice: Subject to any disclaimer, the term of this patent is extended or adjusted under 35 U.S.C. 154(b) by 0 days.

(21) Appl. No.: 09/535,628

(22) Filed: Mar. 24, 2000

Related U.S. Application Data

(60) Provisional application No. 60/126,259, filed on Mar. 25, 1999.

(51) Int. Cl.[7] ................................................. H04N 7/12
(52) U.S. Cl. ............................. 375/240.03; 375/240.11; 375/240.19
(58) Field of Search ........................ 375/240.01, 240.02, 375/240.03, 240.08, 240.1, 240.11–240.14, 240.18, 240.19, 240.2, 240.24; 382/232, 234, 236, 238, 239, 248, 250, 251; H04N 7/12

(56) References Cited

U.S. PATENT DOCUMENTS 5,719,627 A * 2/1998 Ohta ..................... 375/240.14
5,757,973 A * 5/1998 Wilkinson et al. .......... 382/248

OTHER PUBLICATIONS

Medical Image Compression: Optics for the Future, J. Cornelis, A. Munteaun, A. Salomie, P. Schelkens, R. Deklerck, Y. Christophe, V. Enescu, invited paper, 14–th Biennal International Conference, Biosignal '98, Brno, Czech Republic, Jun. 23–25, 1998, pp. 1–12 (7 pages).
A Theory for Multiresolution Signal Decomposition: The Wavelet Representation, Stephane G. Mallat, Copyright 1989 IEEE, (20 pages).
A New Fast and Efficient Image Codec Based on Set Partitioning in Hierarchical Trees, Amir Said, William A. Pearlman, IEEE Transactions on Circuits and Systems for Video Technology, vol. 6, Jun. 1996, (16 pages).
Embedded Image Coding Using Zerotrees of Wavelet Coefficients, Jerome M. Shapiro, IEEE Transactions on Signal Processing, vol. 41, No. 12, Dec. 1993, (18 pages).
Wavelet Transforms for Image Coding, E.A.B. da Silva, PhD University of Essex 1995, (204 pages).

* cited by examiner

Primary Examiner—Young Lee
(74) Attorney, Agent, or Firm—Knobbe Martens Olson & Bear LLP (57) ABSTRACT

Images are subband transformed to create a plurality of subband images. Each subband image includes a plurality of pixels. Each pixel is represented by a plurality of bits with each bit associated to a certain quantization level. Encoding of an image requires scanning essentially all the bits of essentially all the pixels of the image. While scanning in a particular order, one can exploit dependencies within groups of bits consecutively scanned for encoding purposes. Thus, bits of groups can be encoded together. In a subband and transformed image, the scanning order or scanning curve is defined by indicating in which order the system traverses the several subbands and the several quantization levels. One method is characterized in that the set of scanned bits which will be encoded together, and which thus form a group, bits of at least two different sub-images and at least two different quantization levels are recognized.

21 Claims, 8 Drawing Sheets

METHODS AND APPARATUS FOR PROGRESSIVE TRANSMISSION OF SUBBAND IMAGES

RELATED APPLICATIONS

This application claims priority to U.S. Provisional Application No. 60/126,259; filed Mar. 25, 1999.

FIELD OF THE INVENTION

The invention relates to image compression techniques, being exploited for transmission (or storage) of images.

BACKGROUND OF THE INVENTION

General

MPEG-4 and JPEG2000 prerequisites hold concepts like graceful degradation and scalability, implemented in progressive transmission schemes. When transmitting image information over a communication channel, the sender is often not aware of the properties of the output devices such as display size and resolution, and the present requirements of the user—for example when he is browsing through a large image database. To support the large spectrum of image and display sizes and resolutions, the coded bit stream must be formatted in such a way that whenever the user or the receiving device interrupts the bit stream, a maximal display quality is achieved for the given bit rate. The progressive transmission paradigm incorporates that the data stream should be interruptible at any stage and still deliver at each breakpoint a good trade-off between reconstruction quality and compression ratio.

The classic block-based compression techniques (JPEG, MPEG-1, MPEG-2, H.263 . . . ), based on the decorrelating discrete cosine transform, hardly meet these requirements, since information is transmitted on a block basis. Interrupting the bit stream results in a partially reconstructed image, leaving the non-transmitted image part undefined. Additionally, since they are strictly block-based, disturbing block artifacts reduce the visual perception quality.

Figure 1:
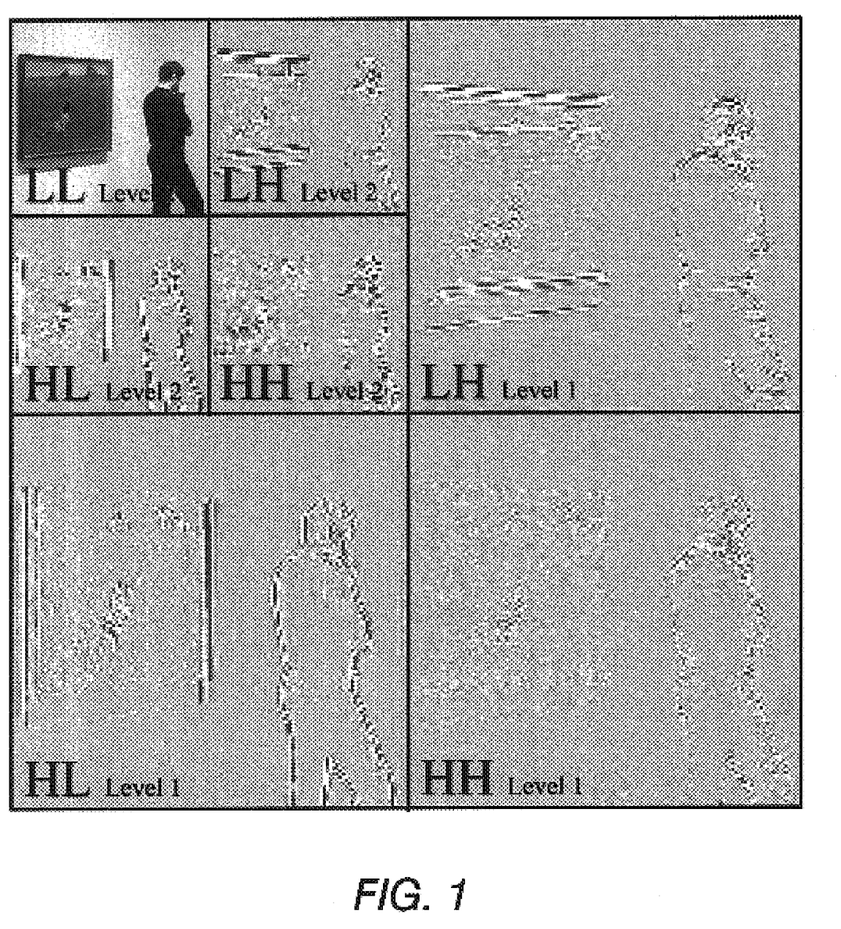
FIG. 1—A 2-level 2D wavelet transform, clearly illustrating the different directional sensitivity of each sub-image.
Figure 2:
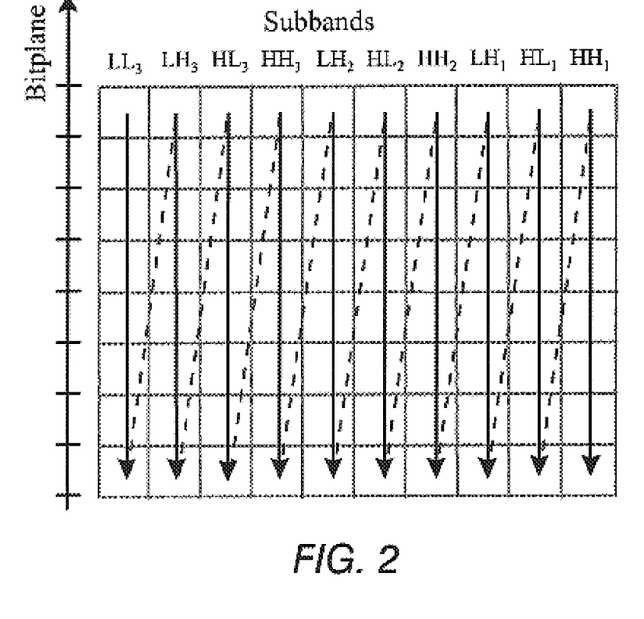
FIG. 2—In classical wavelet encoders the image is transmitted subband per subband, meeting the progressive transmission concept (this figure shows the example of a 3-level discrete wavelet transform).

Wavelet transform based compression schemes avoid the above-mentioned problems since their data path is such that several image resolutions are obtained throughout the coding process (FIG. 1). Transmitting successively all the subbands (also denoted subband images or sub-images), starting with the average sub-image in the top left corner, already fulfils the graceful degradation requirement (FIG. 2). Of course, the relation between the compression ratio and the image reconstruction quality in this subband-by-subband image scanning approach can hardly be called optimal, there all subbands—each with their own weight—contribute to the final quality of the decoded image. For example, the least significant bit-plane of the average subband might for this criterion be less important then for instance the third bit-plane of the first LH-subband.

Note that although the wavelet transform is a particular method, which can be exploited for subband image encoding, and that the invention is illustrated for wavelet-transformed images, the invention is not limited hereto.

State of the art image compression techniques based on subband coding, typically exploit in their quantization and entropy coding steps the preservation of frequency and spatial information. They (e.g. wavelet transform) deliver in the transform domain information concerning the frequencies present at a specific spatial location. Hence, the quantization and entropy coding parts can exploit both the dependency between spatially neighboring pixels in one subband and the dependency between pixels in different subbands at corresponding spatial locations in a rate-distortion sense. Typically the first approach is addressed as intra-subband coding (e.g. quad-tree-based [J. Cornelis, A. Munteanu, A. Salomie, P. Schelkens, R. Deklerck, Y. Christophe and V. Enescu, "*Medical Image Compression: Options for the Future*", Proceedings of Biosignal '98, pp. 1–12, 1998]], the latter as inter-subband coding (embedded zero-tree coding [J. M. Shapiro, "*Embedded Image Coding Using Zero-trees of Wavelet Coefficients*", IEEE Transactions on Signal Processing, Vol. 41, no.12, pp.3445–3462, 1993] and SPIHT[A. Said and W. Pearlman, "*A new fast and efficient image codec based on set partitioning in hierarchical trees*", IEEE Trans. on Circuits and Systems Video Technology 6 (1996) 243–250.]). Both intra-subband and inter-subband approaches successively approximate the subband coefficients by starting with the coarsest refinement level (i.e. most significant bit-plane) and ending at a refinement level needed to obtain the requested compression ratio (or required image quality). Refinement levels are also denoted quantization levels and the quantization approach is referred to as successive approximation quantization (SAQ). Remark that each bit-plane is completely scanned before the processing of another one is started. These methods thus exploit a quantization level-by-quantization level scanning method as opposed to a subband-by-subband scanning approach. With the quantization level-by-quantization level scanning method one is capable of coarsely approximating the optimal rate-distortion behavior when all required bits are transmitted while performing an appropriate thresholding to obtain the required compression quality. However, if the bit-stream is interrupted at an earlier stage in the transmission the obtained rate-distortion is far from satisfactory due to the bad weighting of the information in the different subbands: relatively seen we have transmitted too much information of one subband compared to another subband. Thus, a correct thresholding was not obtained.

Embedded Zero-tree Coding

Since, the invention is further illustrated for embedded zero-tree encoding, we will first discuss this coding approach. However, we have to stress that the invention is not limited hereto, and is applicable to all SAQ-based compression schemes.

Figure 3:
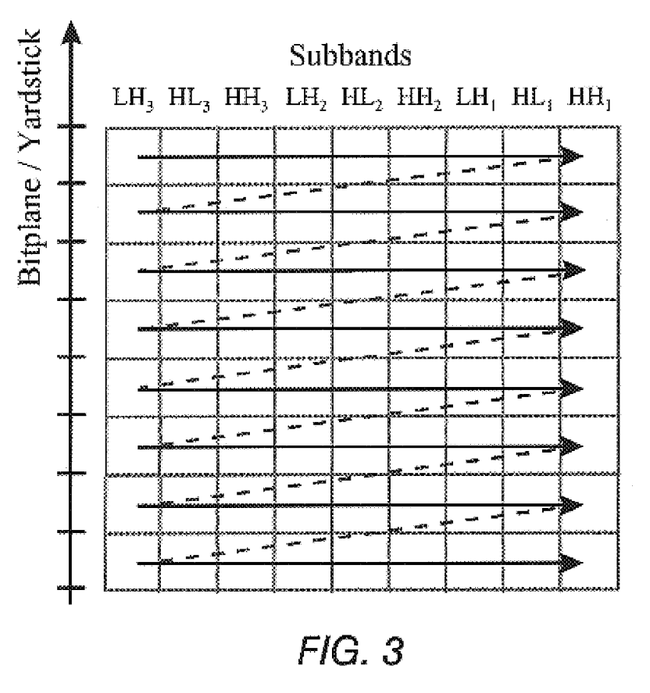
FIG. 3—SAQ scanning curve used to traverse the different sub-images (horizontal axis) and bit-planes (vertical axis). Each bit-plane (quantization level) is fully encoded before the succeeding one is considered. Within a bit-plane the top-level sub-images do have a higher priority.

By carefully studying the redundancy between spatially corresponding pixels of the different subbands, a remarkable coherence was revealed. J. Shapiro figured out that exploiting this property enhances the compression performance [J. M. Shapiro, "*Embedded Image Coding Using Zero-trees of Wavelet Coefficients*", IEEE Transactions on Signal Processing, Vol. 41, no.12, pp.3445–3462, 1993.]. He considered the relation between spatially related pixels of different subbands as parent-children links. In the context of a N-level discrete wavelet transform, this means that a pixel in a level l sub-image (either LH, HL or HH) corresponds spatially to four pixels in the level l−1 sub-image with the same type of frequency constellation, i.e. LH, HL or HH. The inter subband correlation is exploited using the fact that the probability is rather high that magnitudes of the child pixel values are smaller than a certain threshold, whenever the parent's magnitude value is smaller than that threshold. This means that all the pixels of the same spatial locality can be coded in one step i.e. zero-tree coding. Within this scalar quantization method the comparison is performed with a threshold corresponding to the bit-planes (also denoted quantization levels). Thus, progressive transmission capabilities are an inherent property of the coding scheme, i.e. gradually refining the threshold levels (e.g. coding from the most significant bit-plane towards the least significant bit-plane) and respecting the order of importance of the subbands (FIG. 3). This way of image scanning rules out the objections against classic schemes (FIG. 2).

Since the embedded zero-tree wavelet encoding technique proposed by J. Shapiro utilizes scalar quantization, it partially fails to recognize spatial structures within the subbands, i.e. spatial redundancy. To overcome this shortcoming a progressive vector quantization based embedded zero-tree coding was introduced by E. da Silva [E. A. B. da Silva, "Wavelet Transforms for Image Coding", PhD Dissertation, University of Essex, England, 1995.]. The significance of an image vector—composed out of a set of neighboring pixels—is evaluated by comparing the magnitude of that vector with a yardstick value, i.e. a vector threshold. This value allows layering the subbands similarly to the bit-plane concept in the scalar case (FIG. 3). As such this vector quantization also defines quantization levels. The vector codebook consists out of a set of normalized lattice-based directional code vectors.

As said in the introduction, a straightforward implementation of the above mentioned quantization level-by-quantization level scanning methods ([J. M. Shapiro, "Embedded Image Coding Using Zero-trees of Wavelet Coefficients", IEEE Transactions on Signal Processing, Vol. 41, no.12, pp.3445–3462, 1993.], [E. A. B. da Silva, "Wavelet Transforms for Image Coding", PhD Dissertation, University of Essex, England, 1995.]) does not lead to maximal coding performance, since both methods give the same weight to the information present in the different subbands. Thus, thresholding has to be introduced.

Figure 4:
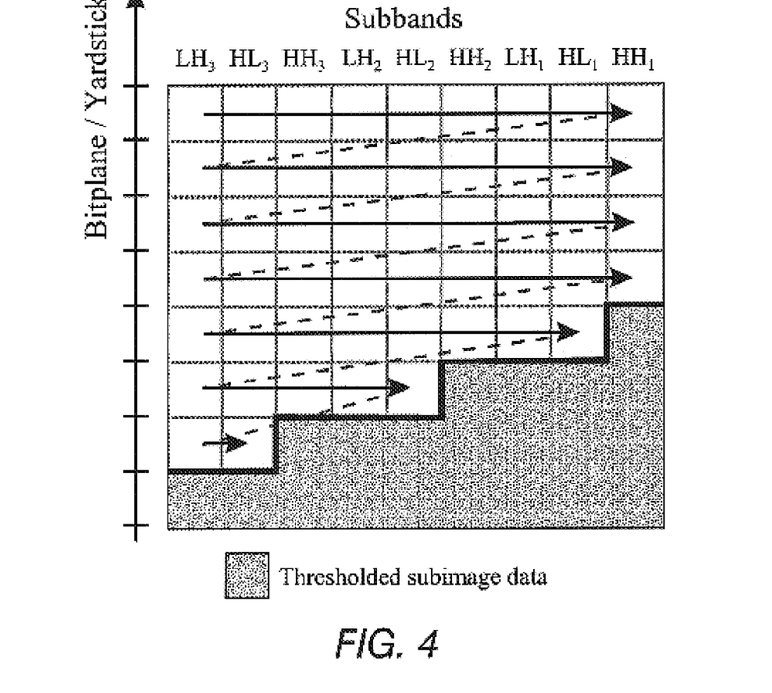
FIG. 4—Hard thresholding is obtained by omitting a number of lower layers dependent on the sub-image statistics.

Practice indicates that the subbands do have a different energy and bit-range. The energy differences suggest that the information content of the different subbands is heterogeneous. It is therefore advisable to privilege the subbands with the highest energy. Applying subband dependent hard thresholding in a lossy compression scheme allows privileging the subband with the highest energy (FIG. 4). To find suitable threshold levels for each subband, we have to minimize the quantization error $D(b)$ subject to the total bit-rate $R_q(b)$, where the vector b represents the bit-rates allocated to the different subbands [G. Strang, T. Nguyen, "Wavelets and Filter Banks", Wellesley-Cambridge Press, Wellesley, USA, 1996]. The bit-rate is an indication of the number of bits that is being considered for compression, it does not reflect the effective rate obtained after arithmetic encoding, being part of further coding steps.

$$D(b) = \sum_{k=1}^{M} \alpha_k \omega_k 2^{-2b_k} \sigma_k^2 \tag{1}$$

$$R_q(b) = \sum_{k=1}^{M} \alpha_k b_k \tag{2}$$

M represents the total number of subbands, $\alpha_k$ is the relative subband size, $\omega_k$ is the perceptual weighting factor, and $\sigma_k^2$ the subband variance. The latter is a good representative of the subband energy. Remark that while the low pass image at the highest wavelet level has a Gaussian distribution, the high pass images do have a Laplacian distribution. Assuming we want to obtain a certain fixed bit-rate $R_{q,c}$, minimizing D(b) can be solved by applying a method based on Lagrange multipliers:

$$\sum_{k=1}^{M} \frac{\partial}{\partial b_k}[D(b) + \lambda(R_q(b) - R_{q,c})] = \sum_{k=1}^{M} \frac{\partial}{\partial b_k}[\alpha_k(\omega_k 2^{-2b_k}\sigma_k^2 + \lambda b_k)] = 0 \tag{3}$$

The differentiation with respect to $b_k$ delivers then:

$$b_k = \frac{1}{2}\log_2 \frac{(2\ln 2)\omega_k \sigma_k^2}{\lambda} \tag{4}$$

The fixed bit-rate constraint $R_{q,c}$ poses:

$$\sum_{k=1}^{M} \alpha_k b_k = \frac{1}{2}\sum_{k=1}^{M} \alpha_k \log_2 \frac{(2\ln 2)\omega_k \sigma_k^2}{\lambda} = R_{q,c} \tag{5}$$

This yields then the Lagrange multiplier $\lambda$:

$$\lambda = 2^{\sum_{k=1}^{M} \alpha_k \log_2[(2\ln 2)\omega_k \sigma_k^2] - 2R_{q,c}} \tag{6}$$

Equations (4) and (6) provide the bit lengths $b_k$. For small variances the results can be negative, and therefore they should be truncated to zero. The calculations have then to be repeated for a reduced number of subbands—ignoring the insignificant ones—until all $b_k$ are bigger or equal to zero, and adjusting the fixed bit-rate to:

$$R_{q,c} = \sum_{k=1}^{M} \alpha_k b_k \tag{7}$$

The perceptual weighting factors $\omega_k$ are weighing the different subbands in such a way that the visual perception of the image is optimized.

Although the described subband dependent hard thresholding (FIG. 4) allows privileging the subband with the highest energy, it still works in a quantization level-by-quantization level scanning manner.

AIM OF THE INTENTION

The invention aims at presenting a new scanning method through a subband encoded image (e.g. wavelet transformed image) which should retain the intrinsic capacity to continue coding When the transmission channel is not saturated or when devices with different resolutions are mounted to the communication channel. The transmission scheme should have inherent graceful degradation capabilities and should ensure an optimal trade-off between the image reconstruction quality and the compression ratio.

SUMMARY OF THE INVENTION

In the invention a method for progressive transmission of encoded images is presented.

Said image can be an individual image or being part of a sequence of images. An image is represented in a digital system as an array of pixels. Said image is stored in a memory of said digital system. From a programming point of view an image can be considered as a two-dimensional data type, although said image is not necessarily rectangular.

An image can be considered as a digital representation of a natural and/or synthetic scene (e.g. a photo) or a still image from a video recorded scene. Such an image can however have been transformed into another digital representation, from which the related reality cannot be retrieved by the human means only.

The invented progressive transmission method exploits subband transformed images. A subband-transformed image comprises a set of subband images.

As in digital processing finite word length is exploited, quantization is necessary. Such a quantization can be performed on the pixel level, meaning that for each of the pixels a set of bits is assigned and based on the value of a pixel said bits are being set to one or zero. Such a quantization can be performed on a group of pixels also. Due to quantization, quantization levels (yardsticks, bit-planes) are defined.

When one wants to transmit an entropy encoded subband transformed image from a first digital system to a second digital system, one has to select a scanning method being the ordering in which bits, representing said image in said first digital system, are grouped, encoded and transmitted, possibly after some further coding.

In the prior art a first scanning curve, scanning the subband transformed image, in a subband-by-subband manner, meaning processing all bits (all quantization levels) of a subband before processing another subband's bits, is disclosed. The ordering of the subbands is predetermined. The ordering of the quantization levels is typically from the most significant quantization level to the lowest significant quantization level. After processing, the produced data can be reordered. However, bits in different subbands are independently encoded. This scheme is only applicable for intra-subband encoding techniques.

In the prior art a second scanning curve, scanning the subband transformed image, in a specific quantization level-by-quantization level manner, meaning processing all bits of all subbands of the same quantization level before processing another quantization level bits, is disclosed. The ordering of the subbands is predetermined. The ordering of the quantization levels is typically from the most significant quantization level to the lowest significant quantization level.

In the invention a scanning curve, is disclosed for scanning the subband transformed image in another quantization level-by-quantization level like manner, such that at least bits of a first subband in a quantization level, said level being specified for said first subband, and bits of a second subband in a quantization level, said level specified for said second subband, are together processed, meaning together encoded. The choice of the specific quantization level of each subband, of which the bits are encoded together, is such that at least two of said subbands have a different quantization level. The ordering of the subbands and the associated quantization level is predetermined by the scanning curve. The ordering of quantization levels for each subband with the scanning curve is typically from the most significant quantization level to the lowest significant quantization level. This approach includes that inter-pixel dependencies can be exploited across different quantization levels and subbands.

The invented image scanning method can be exploited for subband transformed images based on wavelet transforms, but is not limited hereto.

It can be stated that the invention presents a new scanning curve through the data (pixels, bits) representing a subband-transformed image. The scanning curve results in a specific scanning pattern over the different subbands and the different quantization levels.

The transmission scheme, exploiting the invented image scanning method has inherent graceful degradation capabilities and ensures an optimized trade-off between the image reconstruction quality and the compression ratio. The latter is not evident since hard thresholding is required to meet this requirement for a specific PSNR requirement. This scanning method is applicable on both scalar (pixel based) and vector (grouping of pixels) quantization based schemes but is not limited hereto. Additionally, it is applicable on all mentioned SAQ techniques, thus both intra-subband and inter-subband entropy encoding techniques.

In all the scanning methods found in the prior art, further coding (entropy coding) is performed by evaluating the bit characteristics over all subbands, either by comparing at an identical quantization level neighboring pixels in the subband transformed image (the pixels can be positioned in different subbands with e.g. the Mallat organization [S. Mallat, "A Theory for Multiresolution Signal Decomposition: The Wavelet Representation", IEEE Transactions on Pattern Analysis and Machine Intelligence, Vol.11, No.7, pp. 674–693, 1989.]), either by exploiting the dependency between spatially related pixels in different subbands (e.g. zero-trees) at identical quantization levels.

It is an aspect of the invention to recognize that a particular scanning curve is needed to have a more optimal relation between the quality of the reconstructed image and the compression ratio.

In the invented scanning method the encoding is performed over different quantization levels, i.e. dependencies are exploited by comparing the bit values in the different subbands at different quantization levels. The approximation error tolerated in each subband is determined by a bit allocation process, using image (or subband) parameters (e.g. variance) as indicating parameters, possibly combined with perceptual weighting factors (indicating the visual importance of the subband, i.e. a subjective parameter). Further coding (e.g. zero-tree coding) can be performed simultaneously with scanning. It must be emphasized that the invention performs an optimization of the quality of the reconstructed image and the compression ratio, which is embedded with the encoding. No preprocessing of the image is needed. This is in contrast with visual frequency weighting, wherein wavelet coefficients are rescaled with visual weighting factors before being quantized and encoded.

The invention thus results in a progressive, graceful enhancement of the decoded image due to the optimal embedded bit-stream characteristics.

DETAILED DESCRIPTION OF THE INVENTION

The invention deals with images. Said images are sub-band transformed and thus within said images a plurality of subband images can be distinguished. An image, thus also each subband, comprises of a plurality of pixels. Pixels are represented by a plurality of bits; each of said bits is associated to a certain quantization level.

The invention presents methods and an apparatus implementing these methods for encoding an image. Encoding of an image requires scanning essentially all bits of essentially all pixels of said image and while scanning in a particular scanning order one exploits dependencies within groups of bits consecutively scanned for encoding them. Thus said bits of said groups are encoded together.

In a subband transformed image, the scanning order or scanning curve is defined by indicating in which order one traverse the several subbands and the several quantization levels.

The invented encoding method is characterized in that in the set of scanned bits, which will be encoded together, and which form thus a group, bits of at least two different sub-images and at least two different quantization levels are recognized.

It must be emphasized that in the prior-art disclosed subband by subband scanning is presented. Bits within one subband are encoded together in such an approach. No encoding, such that dependencies of bits of different subband images are exploited, is shown. In the prior-art also a quantization level by quantization level scanning is presented. Bits within one quantization level are encoded together in such an approach. No encoding such that dependencies of bits of different quantization levels are exploited, is disclosed.

The invented encoding method is part of a progressive transmission approach. While transmitting from the transmitting peer to a receiving peer (or a plurality of receiving peer) the decoding resources at the receiving peer are not always known. A progressive transmission approach guarantees that the decoding of the encoded bit-stream results in a continuously improving quality of the decoded image as the transmission and decoding continues. Such a progressive transmission approach relies on the encoding method used in the transmitting peer. More in particular the encoding method must select the grouping of bits to be encoded together in a particular way.

The invented method exploits the fact that quality of the decoded image relies on bits of different sub-images and bits of different quantization levels. One can state that the invented method selects its scanning curve such that a progressive transmission method is enabled. One can define for the decoded image the quality levels to be obtained after transmitting an amount of bits. For each discrete value of the quality level, a particular group of bits, to be encoded together, is uniquely assigned. One can state that the invented method groups bits of at least two different subbands and at least two different quantization in each group and further performs an ordering of said groups according to the quality level that will be obtained when the groups being transmitted are received at the decoding receiving peer. The invented method encodes (and also transmits) said encoded bits according to the quality ordering, meaning that the group of bits contributing the most to the quality of the decoded image are encoded and transmitted first.

Note that while encoding said groups of bits intra-subband coding or known inter-subband coding techniques can be used.

Figure 5:
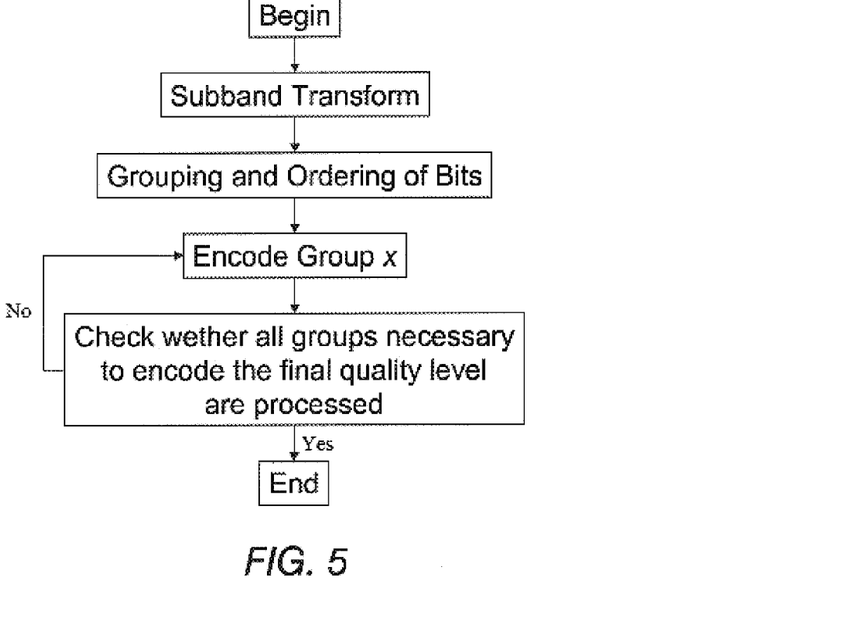
FIG. 5—Flow chart of the grouping an ordering strategy.
Figure 6:
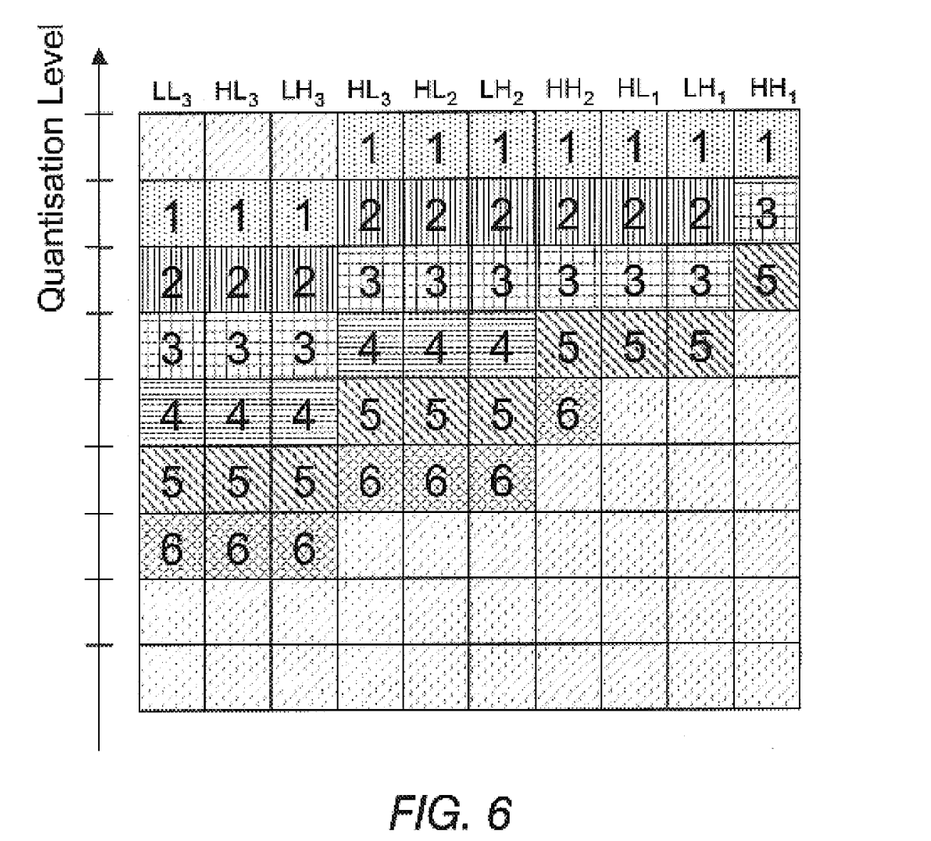
FIG. 6—Abstract illustration of the grouping strategy.

The flowchart of the described invention is depicted in FIG. 5. FIG. 6 illustrates such a process. The bits of the different quantization levels are grouped to support six reconstruction quality levels. Each group is separately encoded and depending on the selected technique inter- and/or intra-subband dependencies are exploited within the group. Remark that these dependencies are exploited across different quantization levels. Additionally, we have to remark too that in the illustration encoding ended at quality level six. However, the technique does not prohibit to finally encode a quality level that gives support for lossless reconstruction.

In principle the invented encoding method will be privileging subbands with higher energy as hard thresholding techniques do, but it recognizes also the different importance of the quantization levels, which is not taken into account in the quantization level-by-quantization level scanning techniques. The invention is compatible with methods that apply perceptual weighting factors to different subbands. The invention can be characterized as a method wherein the visual perception of the decoded image is optimized by weighting both the different subbands and the different quantization levels. In the prior-art this optimization process is set-up in a context of a fixed bit-rate and in a quantization-by-quantization level approach. In the invention instead the optimization process works as follows: one starts with a minimal bit-rate and selects the optimal grouping of bits (across different subbands and across different quantization levels), to be encoded (while exploiting dependencies across said grouped bits) and transmitted such that a still optimal reconstruction at the receiving peer can be obtained, next one increases said bit-rate, and determines the next group of bits to be encoded and transmitted, and one continues this process until essentially all bits are considered. In an embodiment of the invention encoding of a set of bits is also considered.

The invented scanning method is valid for both scalar and vector quantization. The invention is illustrated for wavelet transformed images and embedded zero-tree coding but is not limited hereto, and addresses generally all subband transformed images.

Figure 7:
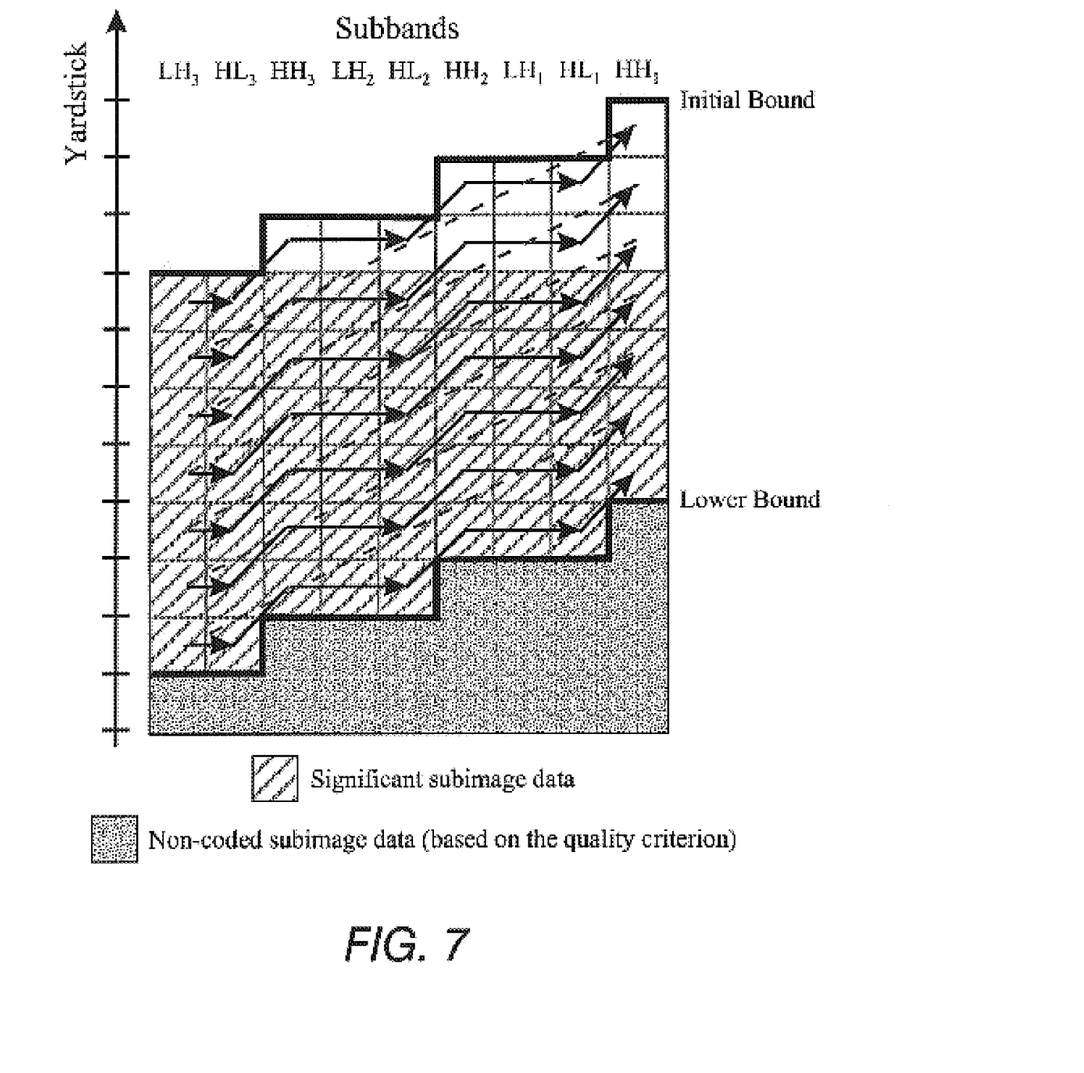
FIG. 7—Improved progressive transmission being based on a sort of quantization level by quantization level scanning method, but for at least two of the sub-images a different quantization level is exploited.
Figure 8:
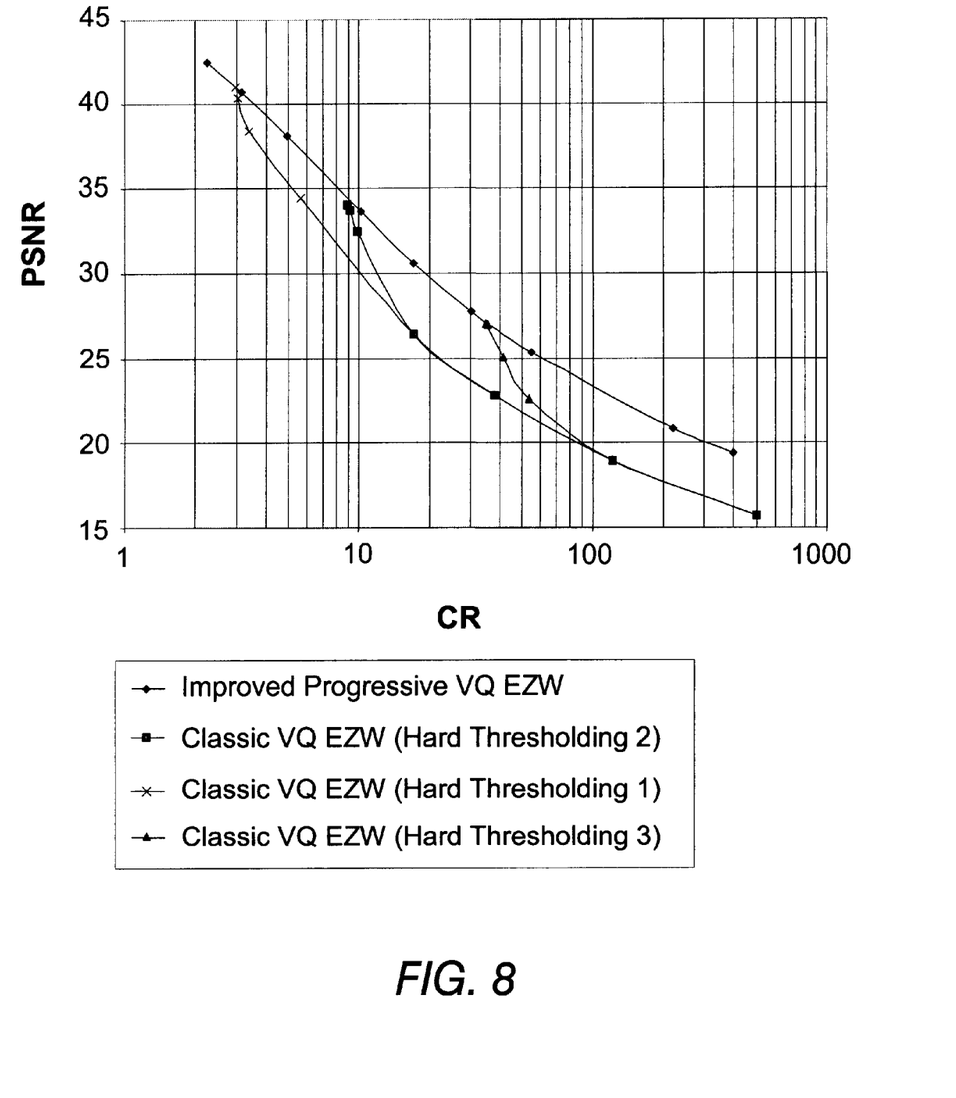
FIG. 8—Comparison of a classic vector based (VQ) EZW compression scheme and the improved scheme. The coding is illustrated for the Lena image (256*256 pixels—8 bit), applying a 5-level wavelet transform.
Figure 9:
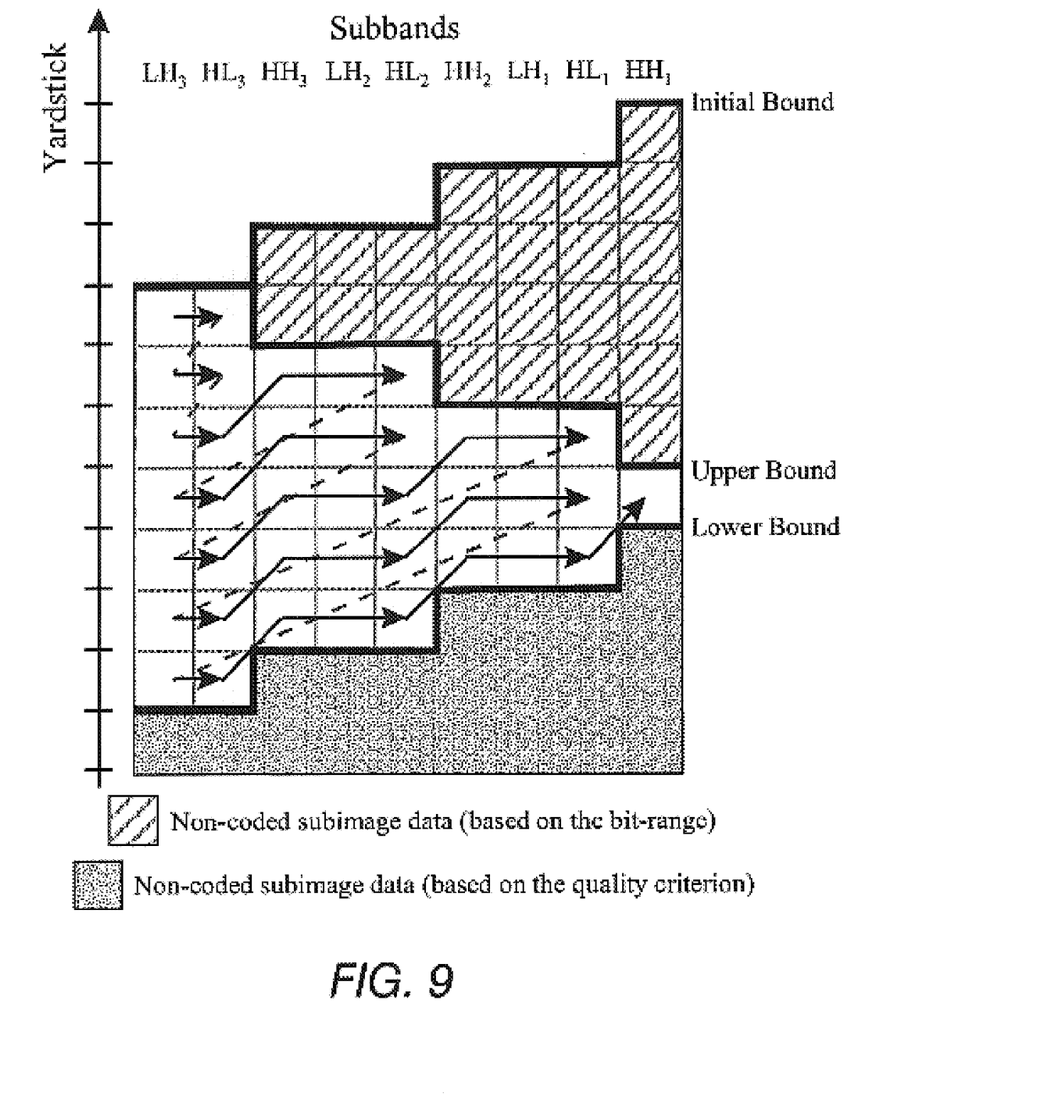
FIG. 9—The data scanning curve bounces between the upper and lower bounds, respecting the energies of the sub-images during the coding process.

The proposed method considers the coding boundaries between which the respective yardsticks (also denoted quantization levels) have to progress. A specific yardstick is defined for each sub-image (also denoted subband image). The lower boundaries of the yardstick variables are determined by the maximum required image quality and registered into the lower bound vector (FIG. 7). The initial values of the yardstick vector are defined by the initial bound. This initial yardstick vector should be parallel with the lower bound vector, which ensures that the coding process respects the subband hierarchy determined by the energies of the different subbands. Coding of a specific subband ends when the yardstick vector element equals the lower bound vector element. Pixel values or vector magnitudes are then treated as non-significant. It is important to remark that the parent-children relations are evaluated in the scanning process corresponding to the yardstick vector, containing for each subband the yardstick value for the current approximation step (FIG. 7). This means that the correlation is exploited between a parent at a certain yardstick value and a set of children at another yardstick value. Practice indicates that this does not lower the compression quality. Theoretically, this is easily explained considering the probabilities of zero-tree occurrence in the different sub-images and planes. These probabilities do increase when the considered yardstick level increases for the child's sub-image, which is usually the case (as shown in the example of FIG. 7). The original hard thresholding technique obtains an optimal coding performance when reaching the desired prefixed bit rate. However, when the bit stream is interrupted earlier, this requirement is not met, while the improved invented scanning curve will still satisfy this prerequisite. This is illustrated in FIG. 8, where three different hard thresholding levels (indexed 1, 2 and 3), each optimized for a certain bit-rate, are compared to the improved technique. Additionally, an upper coding bound is introduced by considering the dynamic ranges of the sub-images (FIG. 9).

This allows reducing the computational load. A subband is encoded if the yardstick vector element for the specified subband is smaller than or equal to the upper bound vector. If this is not the case, the vector magnitudes of the considered subband are treated as non-significant. Remark that it would be a bad strategy to equalize the initial subband yardsticks to the upper bounds, since the coding process would then neglect the energy hierarchy of the different sub-images. This would result in a lower probability of zero-tree occurrence.

Figure 10:
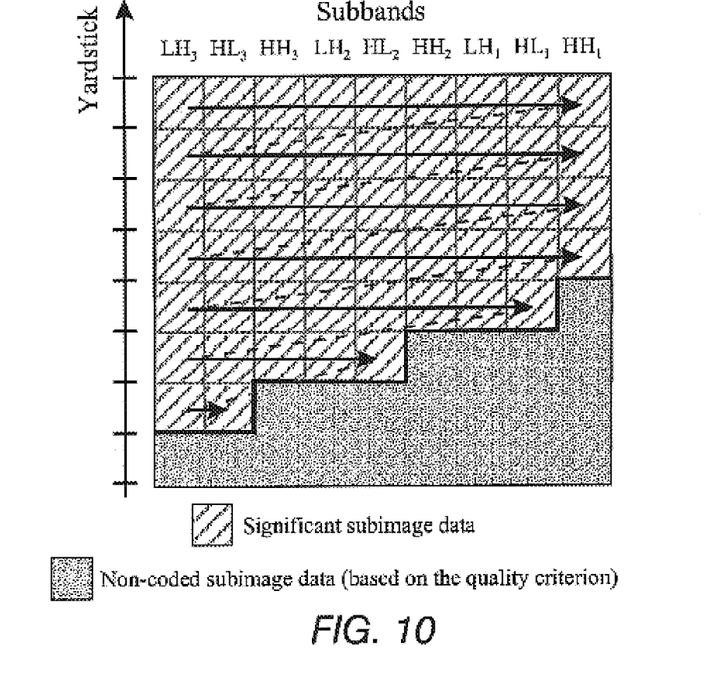
FIG. 10—Hard thresholding
Figure 11:
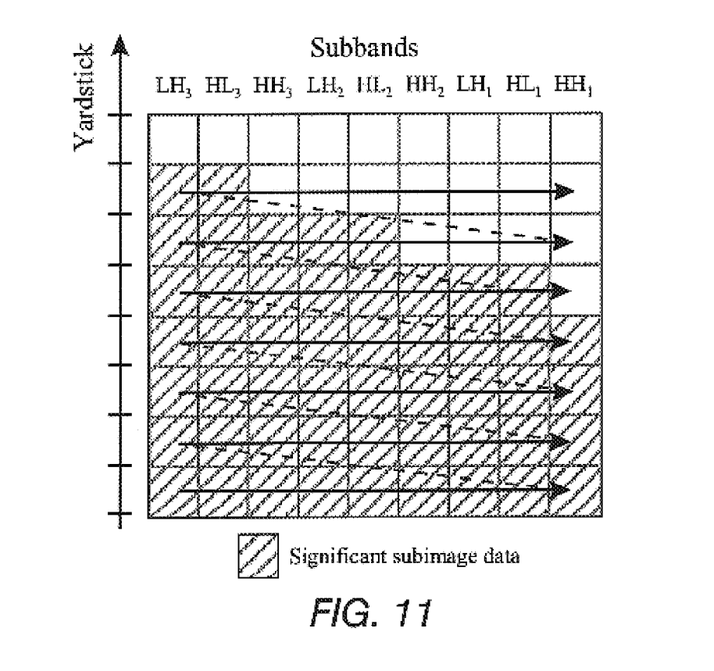
FIG. 11—Soft thresholding

Looking carefully to the previous proposed methods, one should notice a remarkable resemblance with the soft thresholding technique. This technique applies the following function as preprocessing step to the image:

$$p_k(i, j) = p_k(i, j) - \text{sign}\,[p_k(i, j)] \cdot T_k \quad (9)$$

with $p_k(i,j)$ the pixel value on position (i,j) in subband k and $T_k$ the respective threshold level. The principle is illustrated by FIGS. 10 and 11, the first representing the hard thresholding principle, the latter the corresponding soft thresholding output.

If one compares the soft thresholding scanning curve (FIG. 11) with the improved scanning curve (FIG. 7), which is obtained for the same compression situation, it is clear that both curves treat the subband data with identical priority: the coding order of the subband data is identical. Nevertheless, the improved progressive transmission is an embedded technique, while soft thresholding requires a preprocessing stage. Additionally, due to the removal of non-significant data in the preprocessing step, coding ends for the soft thresholding technique when meeting the lower coding bounds. For the improved technique coding can still go on. This is important, since it is not possible to predict the exact required threshold levels for a certain bit-rate. The quantization entropy-encoding step (e.g. zero-tree coding and arithmetic encoding) exploits dependencies between pixels, which are not predictable during the bit allocation process defining the threshold levels.

Additionally, the proposed method is also related to the scaling approach used in visual frequency weighing. Typically this technique is used to obtain an optimal visual reconstruction of the image for the targeted bit-rate and displaying circumstances, by taking into account the contrast sensitivity properties of the human visual system. When applying the derived visual weighing factors to the respective subbands the wavelet coefficients are altered. If an SAQ approach is then used to encode data a similar effect is obtained as with the proposed new scanning method. However, if visual progressive coding is desired (i.e. multiple sets of weighing factors are successively applied to have for example support for an heterogeneous set of displaying devices), it becomes very difficult—if not impossible—to use a system purely based on successively multiplying wavelet coefficients with the required visual weighting factors. This approach would result in multiple encoding of the same bits. Hence, the invention claimed in this document takes care of this problem in an elegant way. Preferably the scaling factors used in the invention are powers of two.

Remark that, in the presented embodiment of the invention, the low pass subband is not scanned. In contradiction to Shapiro's original implementation, in this embodiment a non-wavelet based lossless coding applies on the average subband. However, this is not relevant for the proposed invention.

It can be concluded that the proposed scheme improves the classic progressive SAQ schemes, since it combines both the progressive and the thresholding concepts without paying off on the reconstruction quality and compression ratio parameters (FIG. 2).

This general scheme is applicable in both scalar and vector embedded zero-tree wavelet coding schemes but not limited hereto. For example, the squares delineating the subband areas to be encoded with the quad-tree encoding technique can cover several subbands, and thus require the introduction of the above mentioned improvement to have a correctly weighted SAQ encoding, and consequently a fully embedded bit-stream.

What is to be claimed is:

1. A method for encoding an image comprising:
    transforming a digital image into a subband transformed image, said subband transformed image comprising a plurality of subband images, each of said subband images comprising a plurality of pixels, each of said pixels being associated to a plurality of bits, each bit being part of a quantization level;
    grouping said bits of said image such that each group is associated with a discrete value of the quality of the image and substantially all of the groups are characterized in that each group comprises bits of at least two different sub-images and at least two different quantization levels;
    encoding each group separately to form encoded groups; and
    transmitting the encoded groups in an order according to the quality of the reconstructed image.

2. The method recited in claim 1, further comprising:
    assigning each groups of bits to an image quality level;
    ordering said groups of bits according to said image quality level; and
    encoding said groups of bits according to the ordering.

3. The method recited in claim 2, wherein said encoding comprises an intra-subband encoding technique.

4. The method recited in claim 2, wherein said encoding comprises an inter-subband encoding technique.

5. The method recited in claim 2, wherein said grouping of bits and ordering of said groups comprises a recursively performed visual quality optimization process.

6. The method recited in claim 2, wherein said grouping of bits and ordering of said groups comprises a recursively performed quantization error optimization process.

7. An image encoding apparatus comprising:
- means for transforming a digital image into a subband transformed image, said subband transformed image comprising a plurality of subband images, each of said subband images comprising a plurality of pixels, each of said pixels being associated to a plurality of bits, each bit being part of a quantization level;
- means for grouping said bits of said image such that each group is associated with a discrete value of the quality of the image and being characterized in that substantially each group comprises bits of at least two different sub-images and at least two different quantization levels;
- means for encoding each group separately to form encoded groups; and
- means for ordering the encoded groups in an order according to the quality of the reconstructed image.

8. The system of claim 7 further comprising means for assigning a quality level to each of said groups.

9. The system of claim 7, wherein said encoding comprises intra-subband encoding.

10. The system of claim 7 further comprising means for ordering said groups based on a recursively performed visual quality optimization process.

11. The system of claim 7, wherein said encoding comprises inter-subband encoding.

12. A method of encoding images such that decoding of the encoded bit stream results in a continuously improving quality of the decoding image as decoding continues, the method comprising:
- transforming a digital image into a plurality of subband images, wherein each of said subband images comprises a plurality of pixels, each of said pixels is associated with a plurality of bits and each bit being part of a quantization level;
- grouping said bits of said digital image such that each group supports a different level of image reconstruction quality and such that substantially each group of said groups of bits comprises bits of at least two different subband images and at least two different quantization levels;
- encoding the bits in each group together to form encoded groups; and
- ordering said encoded groups according to the levels of image reconstruction quality.

13. The method of claim 12 further comprising successively transmitting said encoded groups.

14. The method of claim 12 wherein ordering said encoded groups for transmission further comprises ordering the groups before encoding according to the level of image reconstruction quality.

15. The method of claim 14, wherein said encoding comprises intra-subband encoding.

16. The method of claim 14 further comprising ordering said groups based on a recursively performed visual quality optimization process.

17. A digital system for encoding a digital image comprising:
- means for transforming a digital image into a plurality of subband images, wherein each of said subband images comprises a plurality of pixels, each of said pixels is associated with a plurality of bits and each bit being part of a quantization level;
- means for scanning the transformed digital image such that groups can be formed with bits of at least two different subband images and two different quantization levels;
- means for encoding the bits in each group together to form encoded groups; and
- means for transmitting said encoded groups in an order according to the levels of image reconstruction quality.

18. The system of claim 17 further comprising means for assigning a quality level to each of said groups.

19. The system of claim 17, wherein said means for encoding comprises intra-subband encoding.

20. The system of claim 18 further comprising means for ordering said groups based on a recursively performed visual quality optimization process.

21. The system of claim 18, wherein said means for encoding comprises inter-subband encoding.

* * * * *